(12) United States Patent
Takimoto et al.

(10) Patent No.: US 9,258,491 B2
(45) Date of Patent: Feb. 9, 2016

(54) IMAGING METHOD AND IMAGING DEVICE

(75) Inventors: Yuuji Takimoto, Kanagawa (JP);
Takeshi Yaeda, Tokyo (JP); Masanori Miyahara, Tokyo (JP)

(73) Assignee: Sony Corporation, Tokyo (JP)

( * ) Notice: Subject to any disclaimer, the term of this patent is extended or adjusted under 35 U.S.C. 154(b) by 1104 days.

(21) Appl. No.: 13/309,168

(22) Filed: Dec. 1, 2011

(65) Prior Publication Data

US 2012/0147170 A1   Jun. 14, 2012

(30) Foreign Application Priority Data

Dec. 9, 2010  (JP) ................................ P2010-274231

(51) Int. Cl.
*H04N 7/18* (2006.01)
*H04N 5/247* (2006.01)
*H04N 5/232* (2006.01)

(52) U.S. Cl.
CPC ........... *H04N 5/247* (2013.01); *H04N 5/23219* (2013.01)

(58) Field of Classification Search
None
See application file for complete search history.

(56) References Cited

U.S. PATENT DOCUMENTS

| | | | |
|---|---|---|---|
| 2002/0041327 A1* | 4/2002 | Hildreth et al. | 348/42 |
| 2006/0055777 A1* | 3/2006 | Ito et al. | 348/143 |
| 2007/0164748 A1* | 7/2007 | Ishihara et al. | 324/457 |
| 2008/0002866 A1* | 1/2008 | Fujiwara | 382/118 |
| 2009/0256933 A1* | 10/2009 | Mizukami | 348/240.1 |
| 2009/0319888 A1* | 12/2009 | Oygard | 715/252 |
| 2010/0086217 A1* | 4/2010 | Matsuhira | 382/199 |

FOREIGN PATENT DOCUMENTS

JP   2004-282769   10/2004

* cited by examiner

*Primary Examiner* — Kate Luo
(74) *Attorney, Agent, or Firm* — Paratus Law Group, PLLC

(57) ABSTRACT

Disclosed herein is an imaging method including: by an imaging device, detecting a user that can be present in a predetermined area; calculating three-dimensional coordinates of an eye and a hand of the detected user; determining an imaging range on a basis of the calculated the three-dimensional coordinates of the eye and the hand of the user; and imaging the determined the imaging range.

9 Claims, 7 Drawing Sheets

GROUP MEMBERS
PICKED-UP IMAGE

SIMILAR IMAGE

GROUP MEMBERS X
GROUP MEMBERS Y

SIMILAR IMAGE

IMAGING METHOD AND IMAGING DEVICE

BACKGROUND

The present disclosure relates to an imaging method and an imaging device, and particularly to an imaging method and an imaging device that enable photography using a camera installed in a photographing spot of a tourist resort, for example.

When a person visits a place as a so-called photographing spot in a tourist resort or the like, the person needs to carry a camera or the like with himself or herself to take a photograph on the spot.

In addition, even when a person carries a camera, in order to take a group photograph of a group to which the person belongs on the spot, it is for example necessary to ask a person outside the group to perform a shutter operation, or necessary for someone within the group to perform a shutter operation without being photographed in the group photograph. In addition, a timer function or a remote shutter function of a camera may be used.

A method for enabling a commemorative photograph to be taken using a camera installed in advance in a tourist resort or the like has been proposed for a case of not carrying a camera (see Japanese Patent Laid-Open No. 2004-282769, for example).

SUMMARY

However, an invention described in Japanese Patent Laid-Open No. 2004-282769 enables photographing only with a predetermined composition (a direction, a range and the like of the photographing), and a user cannot determine the composition of a photograph.

The present disclosure has been made in view of such a situation. It is desirable to enable a photograph taken with an arbitrary composition to be obtained without a camera being carried.

According to an embodiment of the present disclosure, there is provided an imaging method including: by an imaging device, detecting a user that can be present in a predetermined area; calculating three-dimensional coordinates of an eye and a hand of the detected user; determining an imaging range on a basis of the calculated three-dimensional coordinates of the eye and the hand of the user; and imaging the determined imaging range.

The imaging range can be determined by projecting three-dimensional coordinates of a rectangle identified by fingers of both hands of the user from the three-dimensional coordinates of the eye of the user.

An imaging direction can be determined on a basis of the calculated three-dimensional coordinates of the eye and the hand of the user, and an optimum composition set in advance for the determined imaging direction can be set as the imaging range.

The imaging method according to the embodiment of the present disclosure can further include: by the imaging device, searching images stored in advance for a similar image similar to a picked-up image obtained as a result of the imaging; and correcting the picked-up image using the similar image.

The imaging method can further include, by the imaging device, identifying a group member belonging to a same group as the user among subject persons in the picked-up image obtained as the result of the imaging, wherein a region of a subject person other than the group member in the picked-up image can be replaced using the similar image.

According to another embodiment of the present disclosure, there is provided an imaging device including: a detecting section detecting a user that can be present in a predetermined area; a calculating section calculating three-dimensional coordinates of an eye and a hand of the detected user; a determining section determining an imaging range on a basis of the calculated three-dimensional coordinates of the eye and the hand of the user; and an imaging section imaging the determined imaging range.

In the embodiment of the present disclosure, a user that can be present in a predetermined area is detected, three-dimensional coordinates of an eye and a hand of the detected user are calculated, an imaging range is determined on a basis of the calculated three-dimensional coordinates of the eye and the hand of the user, and the determined imaging range is imaged.

According to the embodiment of the present disclosure, it is possible to obtain a photograph taken with an arbitrary composition without carrying a camera.

DETAILED DESCRIPTION OF THE PREFERRED EMBODIMENTS

Figure 1:
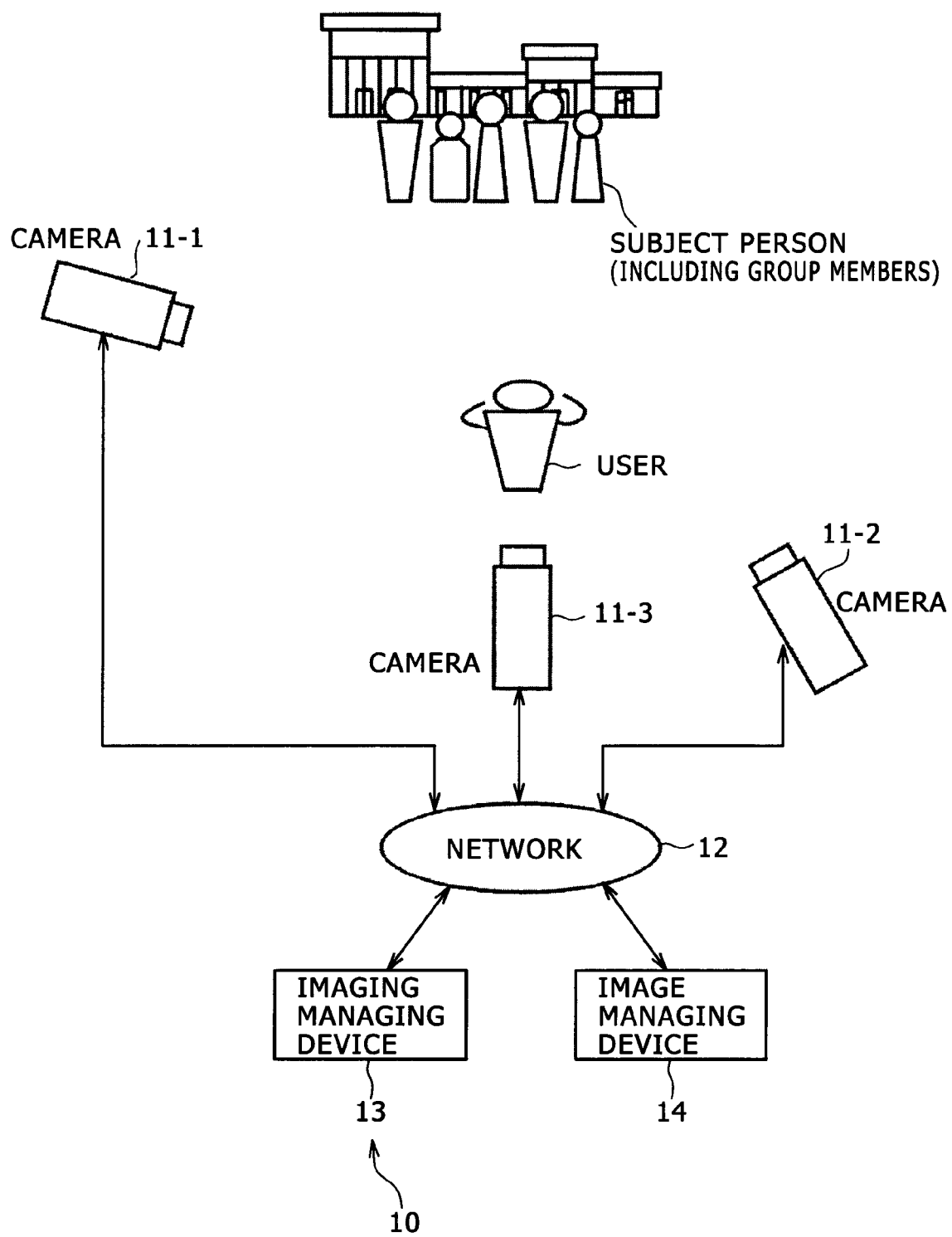
FIG. 1 is a block diagram showing an example of configuration of an automatic imaging system to which embodiments of the present disclosure is applied.

The best mode (hereinafter referred to as an embodiment) for carrying out the disclosure will hereinafter be described in detail with reference to the drawings.
<1. Embodiments>
[Example of Configuration of Automatic Imaging System]
FIG. 1 shows an example of configuration of an automatic imaging system as an embodiment of the present disclosure. In this automatic imaging system, in response to a predetermined posture (to be described later) indicating the composition of a photograph which posture is assumed by a person not carrying a camera (which person will hereinafter be referred to as a user) in a so-called photographing spot such as a tourist resort or the like, a camera installed on the periphery takes a photograph with the composition (hereinafter referred to also as an imaging range) intended by the user.

The automatic imaging system 10 includes a plurality of cameras 11-1 to 11-3 connected to each other via a network 12, an imaging managing device 13, and an image managing device 14.

The cameras 11-1 to 11-3 are installed in a place that can be a photographing spot. Specifically, the cameras 11-1 to 11-3 are mounted on rails having a predetermined length, for example, and are moved on the rails, whereby the installation positions of the cameras 11-1 to 11-3 can be changed. The cameras 11-1 to 11-3 can also be changed in imaging direction (an azimuth angle and an angle of elevation) and zoom magnification.

The camera 11-1 picks up an image (hereinafter referred to as a first image) for detecting a user and measuring the three-dimensional coordinates of an eye and both hands of the user. The camera 11-1 performs consecutive photographing in a direction in which a user can be present in the photographing spot. The camera 11-1 outputs the first image obtained as a result of the consecutive photographing to the imaging managing device 13 at any time.

The camera 11-2 picks up a second image for measuring a distance between the user and a subject person standing in front of a background such as scenery, a building or the like of the photographing spot. The camera 11-2 performs photographing in a direction in which the user and the subject person in the photographing spot can both be photographed. The camera 11-2 outputs the second image obtained as a result of the photographing to the imaging managing device 13.

The camera 11-3 images a photographing range specified by the imaging managing device 13 in predetermined sampling cycles. The camera 11-3 outputs an image (hereinafter referred to as a third image) obtained as a result of the imaging to the imaging managing device 13. In addition, the camera 11-3 images a photographing range specified by the imaging managing device 13 in specified timing. The camera 11-3 outputs an image (hereinafter referred to as a picked-up image) obtained as a result of the imaging to the imaging managing device 13 together with imaging conditions (the coordinates of the installation position, the imaging direction, and the zoom magnification of the camera 11-3).

Further, the camera 11-3 periodically picks up images as candidates for a similar image (to be described later in detail) to be combined with the picked-up image under varying conditions such as composition, weather, season, time, and the like. The camera 11-3 supplies the obtained images and imaging conditions at the time of the image pickup to the image managing device 14 via the network 12.

Suppose that the imaging conditions of the cameras 11-1 to 11-3 (the coordinates of the installation position, the imaging direction, and the zoom magnification of the camera 11) are notified to the imaging managing device 13 via the network 12, and are grasped by the imaging managing device 13 at all times.

In addition, while the purposes of the cameras 11-1 to 11-3 are differentiated from each other for convenience in the above description, each of the cameras 11-1 to 11-3 can supply the purpose of the other or concurrently serve the purpose of the other.

The cameras 11-1 to 11-3 do not need to be provided exclusively for the automatic imaging system 10. Surveillance cameras, observation cameras, and the like that are already installed may be used as the cameras 11-1 to 11-3.

The imaging managing device 13 includes an image recognizer that has already performed machine learning of images of faces, eyes, hands, and the like of humans. By using the image recognizer, the imaging managing device 13 detects a person as the user from the first image input from the camera 11-1 via the network 12 at any time. Specifically, for example, the imaging managing device 13 regards and detects a person assuming a predetermined posture (with fingers of both hands shown in FIG. 2 forming respective L-shapes and thereby indicating a rectangle) as the user.

Alternatively, for example, a mark (for example a badge or a sticker) indicating a user may be given to a user in advance to be attached to the chest or the like of the user, and the person to which the mark is attached may be detected as the user.

The imaging managing device 13 retains three-dimensional mapping data on ranges that can be photographed by the respective cameras 11-1 and 11-2.

Figure 2:
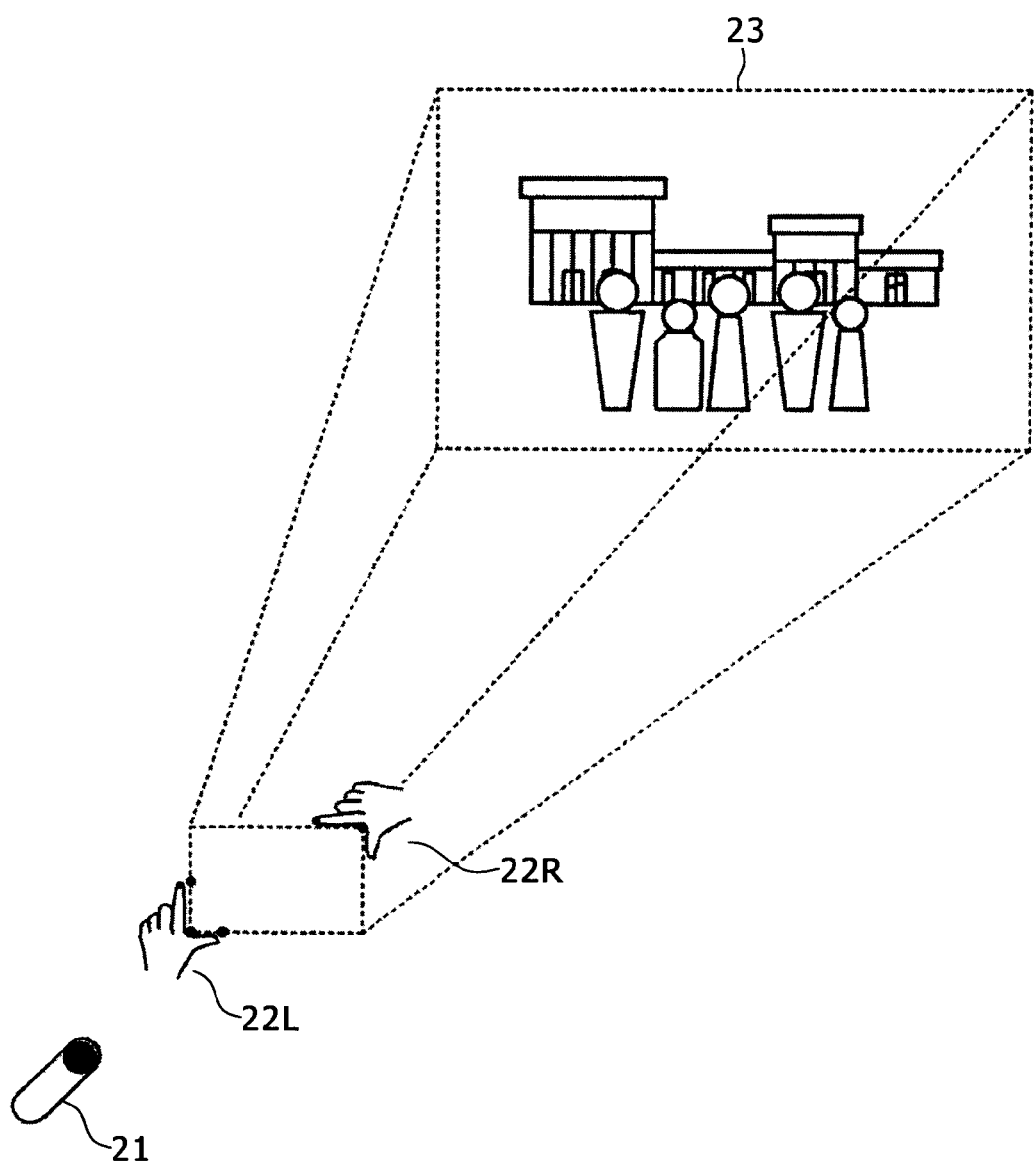
FIG. 2 is a diagram showing relation between the eye and both hands of the user and the composition of a photograph.

FIG. 2 shows relation between the eye and both hands of the user and the imaging range (referred to also as composition, as described above) imaged by the camera 11-3.

Suppose that the user assumes a posture such that fingers of both hands form respective L-shapes and thereby indicate opposite vertices of a rectangle as an imaging range in an imaging direction in order to specify the imaging range, and that the user performs a predetermined shutter operation (for example bends the tip of an index finger, for example) to specify imaging timing.

When the user assumes a posture as described above, the three-dimensional coordinates of the eye 21 of the user are calculated. Next, the three-dimensional coordinates of a total of four points, that is, the three points of the L-shape formed by fingers of one of the left hand 22L and the right hand 22R of the user and the vertex of the L-shape formed by fingers of the other hand of the user are calculated, and the three-dimensional coordinates of the four vertices of the rectangle formed by the hands of the user are identified. Further, an imaging range 23 is determined by performing perspective projection of the four vertices of the rectangle formed by the hands of the user with the position of the eye 21 of the user as a reference.

Incidentally, the imaging managing device 13 may retain, in advance, several kinds of ideal composition for photographs to be taken in the photographing spot in which the cameras 11-1 to 11-3 are installed, and one of the several kinds of composition that coincides with the direction indicated by the hands of the user may be used as the imaging range 23.

It suffices to determine the ideal composition through the composition analysis of a plurality of images picked up on the spot, or to allow the plurality of images to be downloaded and determine the ideal composition on the basis of the numbers of downloads of the plurality of images, or to allow votes to be cast about the evaluation of the plurality of images and determine the ideal composition on the basis of a result of the voting. Alternatively, the ideal composition may be determined from these results taken together.

The use of the ideal composition as the imaging range 23 provides an advantage for the user in that an image of good composition can be obtained by merely roughly specifying a photographing direction. There is also an advantage on the side of the automatic imaging system 10 in that an imaging range can be determined even when the positions of the eye and the hands of the user cannot be recognized accurately due to the position or the imaging direction of the camera 11 or the like.

Returning to FIG. 1, the imaging managing device 13 identifies the positions of the eye and both hands of the user from the first image by using the image recognizer, and calculates the three-dimensional coordinates of the eye and both hands of the user on the basis of the three-dimensional mapping data corresponding to the first image. Further, the imaging managing device 13 calculates a distance between the user and a subject person on the basis of the second image input from the camera 11-2 and the three-dimensional mapping data corresponding to the second image. Further, the imaging managing device 13 determines an imaging range 23 (FIG. 2) on the basis of the calculated three-dimensional coordinates of the eye and both hands and the calculated distance between the user and the subject person, and notifies the imaging range 23 to the camera 11-3.

Incidentally, instead of the imaging managing device 13 retaining the three-dimensional mapping data as described above, the cameras 11-1 and 11-2 may each be replaced with a stereo camera, so that the distance to the subject can be measured on the basis of stereo matching. Alternatively, a range sensor may be incorporated into the cameras 11-1 and 11-2. It is thereby possible to calculate the three-dimensional coordinates of the eye and both hands of the user and calculate the distance between the user and the subject person without using the three-dimensional mapping data.

The imaging managing device 13 estimates persons belonging to a same group as the user (which persons will hereinafter be referred to as group members) among the subject persons appearing in the third image input from the camera 11-3 on a sequential basis, and generates pre-imaging group information indicating a result of the estimation. Specifically, the imaging managing device 13 extracts the eyes of faces of persons from the third image by face recognition processing, and estimates that persons whose directions of lines of sight continue to be the direction of the user for a certain time are group members. The generated pre-imaging group information is associated with information for identifying the user (which information will hereinafter be referred to as user information), and then notified to the image managing device 14 via the network 12 such as the Internet and the like.

In addition, when the imaging managing device 13 detects a predetermined shutter operation (for example bending the tip of a finger forming an L-shape) by the user on the basis of the first image, the imaging managing device 13 makes the camera 11-3 image the imaging range 23 in synchronism with the timing of the shutter operation, and thereby obtains a picked-up image. Incidentally, in a timer mode to be described later, it suffices to effect the imaging in timing delayed by a predetermined time from the timing of the shutter operation. The obtained picked-up image is associated with the user information, and then output to the image managing device 14 via the network 12. Incidentally, a third image coinciding with the timing of the shutter operation among third images input in predetermined sampling cycles may be regarded as the picked-up image.

The image managing device 14 analyzes the picked-up image input from the imaging managing device 13 via the network 12, estimates group members among the subject persons appearing in the picked-up image, and generates post-imaging group information indicating a result of the estimation.

Specifically, as in the generation of the pre-imaging group information, the eyes of faces of persons are extracted from the picked-up image by face recognition processing, and it is estimated that persons whose directions of lines of sight are the direction of the user are group members. In addition, the accuracy of the post-imaging group information may be increased by also estimating group members in another picked-up image picked up in series with the picked-up image in question which group members correspond to the identical user and regarding only persons repeatedly estimated to be group members in the plurality of picked-up images as group members.

Further, the image managing device 14 finally judges only subject persons repeatedly estimated to be group members among the subject persons according to both of the pre-imaging group information and the post-imaging group information to be group members, associates the faces of the group members with the user information, and registers the faces of the group members associated with the user information in a group DB (database) managed by the image managing device 14 itself.

Further, the image managing device 14 searches for an image (hereinafter referred to as a similar image) similar to the picked-up image in question from an image DB managed by the image managing device 14 by comparing the coordinates of the installation position, the imaging direction, and the zoom magnification of the camera 11-3 and the composition.

Incidentally, suppose that the image DB stores a plurality of images picked up by the camera 11-3 under different conditions of composition, weather, season, time, and the like in association with the coordinates of the installation position, the imaging direction, and the zoom magnification of the camera 11-3. Incidentally, because a region in which no person is photographed is used as a similar image, as will be described later, it is desirable that no person be photographed in the similar image. It is difficult, however, to pick up a similar image in timing in which no person is photographed in the photographing spot. Accordingly, regions in which no person is photographed among a large number of images picked up under similar conditions (composition, weather, season, time, and the like) may be combined with each other to generate a similar image in which no person is photographed, and store the similar image.

The image managing device 14 generates a picked-up image in a state of persons other than the group members being erased by replacing a region in which persons other than the group members are photographed in the picked-up image with a corresponding region in which no person is photographed in a similar image. The picked-up image in the state of the persons other than the group members being erased is stored in the image DB in association with the user information. The picked-up image in the state of the persons other than the group members being erased can be displayed or downloaded when the user accesses the image managing device 14 via the network 12 using a portable telephone, a computer, or the like, for example.

[Changing Imaging Mode]

Figure 3A:
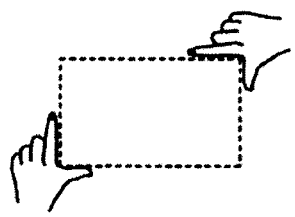
FIGS. 3A, 3B, and 3C are diagrams showing an example of patterns of the posture of hands by a user.
Figure 3B:
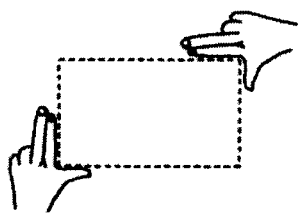
Figure 3C:
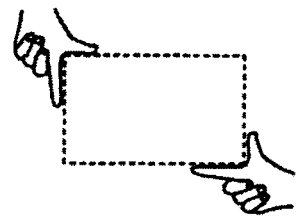

FIGS. 3A, 3B, and 3C show various patterns of the posture of both hands of the user at a time of specifying an imaging range 23. An imaging mode may be changed according to these various patterns.

For example, as shown in FIG. 3A, when the user forms an L-shape with a thumb and another finger (an index finger or the like) with the backs of both hands facing the user himself or herself, a normal mode (in which imaging is performed once immediately in response to a shutter operation) is set.

In addition, for example, as shown in FIG. 3B, when the user forms an L-shape with a thumb and two other fingers (an index finger and a middle finger or the like) with the backs of both hands facing the user himself or herself, a rapid shooting mode (in which imaging is performed a plurality of times in response to a shutter operation) is set.

Further, for example, as shown in FIG. 3C, when the user faces the palms of both hands toward the user himself or herself, a timer mode (in which imaging is performed a few seconds after a shutter operation) is set. When the timer mode is used, the user can move to an imaging range 23 to be a subject person.

The patterns of the posture of the hands shown in FIGS. 3A to 3C and the imaging modes corresponding to the respective patterns are an example, and various combinations are possible.

[Description of Operation]

Description will next be made of the operation of the automatic imaging system 10. The operation of the automatic imaging system 10 includes imaging processing by the cameras 11-1 to 11-3 and the imaging managing device 13 and imaging post-processing by the image managing device 14.

Figure 4:
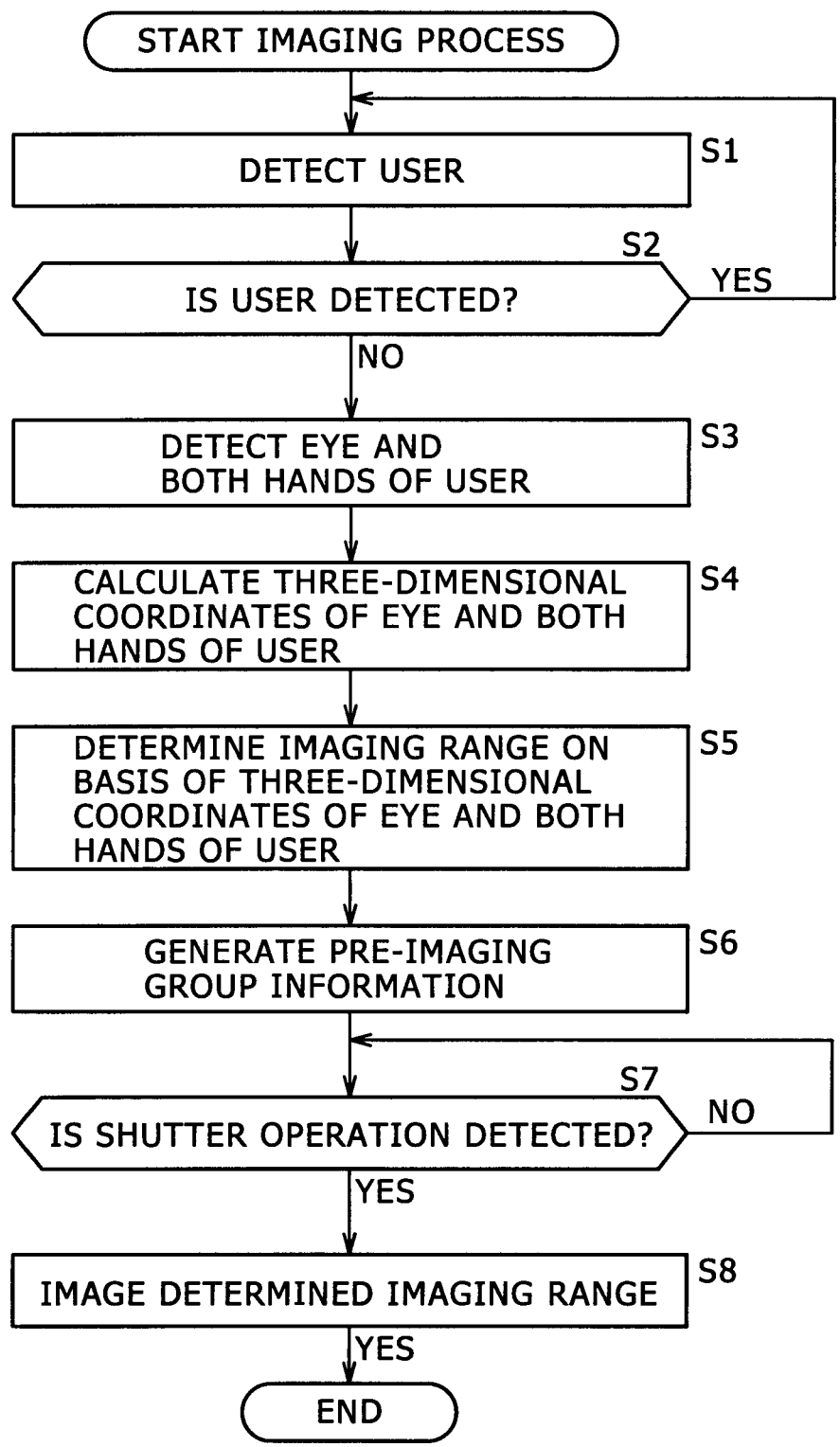
FIG. 4 is a flowchart of assistance in explaining imaging processing.

FIG. 4 is a flowchart of assistance in explaining the imaging processing.

This imaging processing continues being performed repeatedly while the automatic imaging system 10 is operated.

In step S1, the imaging managing device 13 monitors a first image input at any time from the camera 11-1 via the network 12. In step S2, the imaging managing device 13 determines whether a user is detected from the first image. When it is not determined that a user is detected, the processing is returned to step S1 to continue monitoring the first image. When it is determined in step S2 that a user is detected, the processing is advanced to step S3.

In step S3, the imaging managing device 13 detects the positions of the eye and both hands of the user from the first image. In step S4, the imaging managing device 13 calculates the three-dimensional coordinates of the eye and both hands of the detected user. Further, the imaging managing device 13 in step S5 calculates a distance between the user and a subject person on the basis of the second image input from the camera 11-2 and the three-dimensional mapping data corresponding to the second image, determines an imaging range 23 on the basis of the three-dimensional coordinates of the eye and both hands of the user and the distance between the user and the subject person, and notifies the imaging range 23 to the camera 11-3.

According to this notification, in step S6, the camera 11-3 images the notified imaging range in predetermined sampling cycles, and sequentially outputs third images obtained as a result of the imaging to the imaging managing device 13. The imaging managing device 13 estimates group members from among subject persons photographed in the third images sequentially input from the camera 11-3, and generates pre-imaging group information indicating a result of the estimation. In addition, the imaging managing device 13 determines the pattern of the posture of the hands of the user from the first image, and determines an imaging mode.

In step S7, the imaging managing device 13 monitors the first image input from the camera 11-1, and stands by until the imaging managing device 13 detects a predetermined shutter operation by the user. When a predetermined shutter operation by the user is detected, the processing is advanced to step S8.

In step S8, the imaging managing device 13 makes the camera 11-3 image the imaging range 23 according to the determined imaging mode, and thereby obtains a picked-up image. The imaging managing device 13 associates the obtained picked-up image and the generated pre-imaging group information with user information, and transmits the picked-up image and the pre-imaging group information associated with the user information to the image managing device 14 via the network 12. The imaging processing is then ended.

Figure 5:
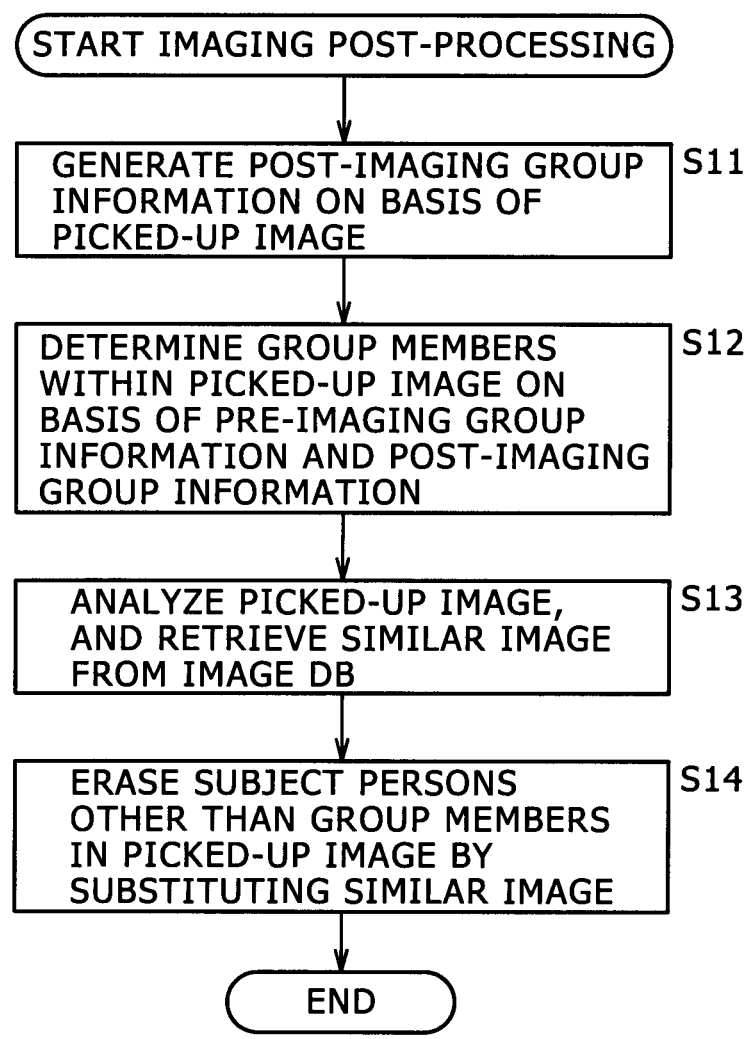
FIG. 5 is a flowchart of assistance in explaining imaging post-processing.

FIG. 5 is a flowchart of assistance in explaining the imaging post-processing. This imaging post-processing is started when the image managing device 14 receives the picked-up image and the pre-imaging group information associated with the user information, the picked-up image and the pre-imaging group information associated with the user information being transmitted from the imaging managing device 13.

In step S11, the image managing device 14 analyzes the picked-up image from the imaging managing device 13, estimates group members among subject persons photographed in the picked-up image, and generates post-imaging group information indicating a result of the estimation.

In step S12, the image managing device 14 finally determines that only subject persons repeatedly estimated to be group members among the subject persons in the picked-up image according to both of the pre-imaging group information and the post-imaging group information are group members.

Figure 6A:
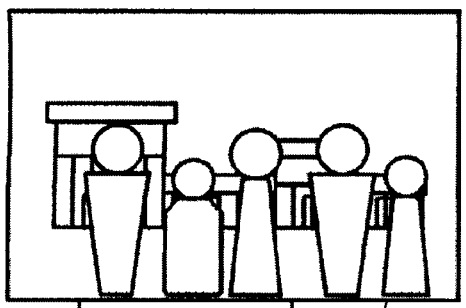
FIGS. 6A, 6B, and 6C are diagrams showing an example of erasing subject persons other than group members.
Figure 6B:
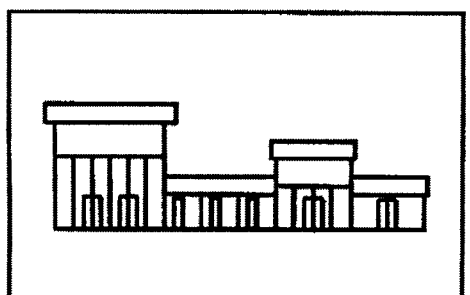
Figure 6C:
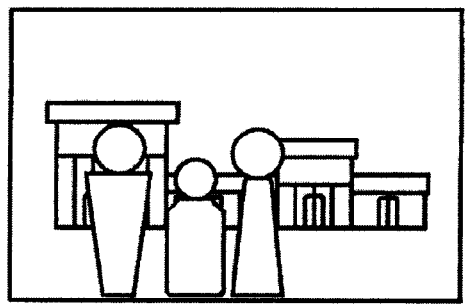
Figure 7A:
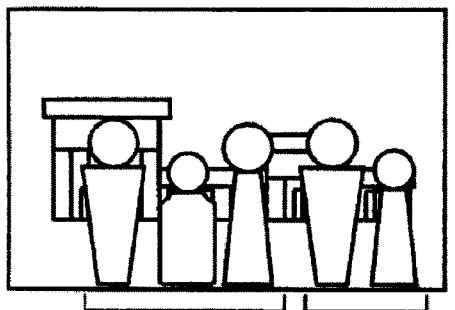
FIGS. 7A, 7B, 7C, and 7D are diagrams showing another example of erasing subject persons other than group members.
Figure 7B:
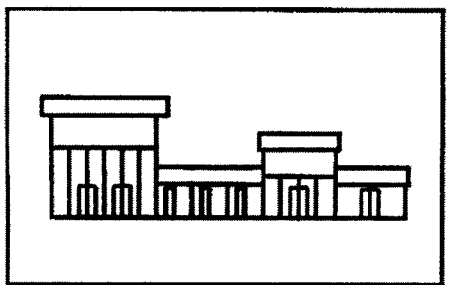
Figure 7C:
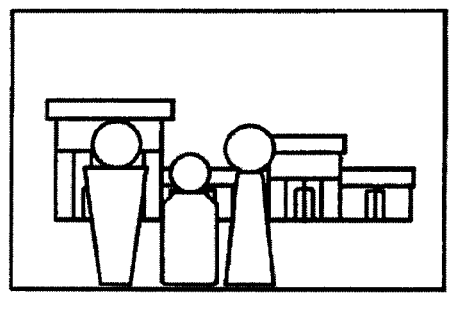
Figure 7D:
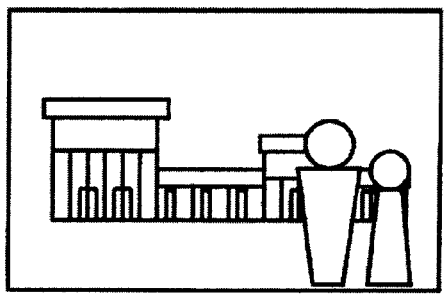

In step S13, the image managing device 14 searches the image DB managed by the image managing device 14 itself for a similar image similar to the picked-up image in question. In step S14, the image managing device 14 for example replaces a region in which the persons other than the group members are photographed in the picked-up image as shown in FIG. 6A with a corresponding region in which no person is photographed in the similar image as shown in FIG. 6B, and thereby generates a picked-up image in a state of the persons other than the group members being erased as shown in FIG. 6C. The imaging post-processing is then ended.

[Another Example of Erasing Subject Persons Other than Group Members in Picked-up Image]

FIGS. 7A, 7B, 7C, and 7D show another example of erasing subject persons other than group members in a picked-up image using a similar image.

As shown in the figures, a plurality of images in which only members of groups (group members X and group members Y) are respectively present may be generated from one picked-up image.

As described above, according to the automatic imaging system 10, a user in a tourist resort or the like can obtain a photograph imaged in a desired direction without carrying a camera with the user.

In addition, a photograph with a composition which photograph could not normally be taken by an individual can be obtained by installing a camera at a high place or installing a camera in a usually off-limits area. In addition, a photograph of high image quality which photograph could not normally be taken by an individual can be obtained when a high-performance camera as used for professional use, for example, is installed.

Further, the imaging managing device 13 may retain, in advance, several kinds of ideal composition for photographs to be imaged in the photographing spot in which the cameras 11-1 to 11-3 are installed, and one of the several kinds of composition in an imaging direction indicated by the hands of the user may be used as the imaging range 23.

It suffices to determine the ideal composition through the composition analysis of a plurality of images picked up on the spot, or to allow the plurality of images to be downloaded and determine the ideal composition on the basis of the numbers of downloads of the plurality of images, or to allow votes to be cast about the evaluation of the plurality of images and determine the ideal composition on the basis of a result of the voting. Alternatively, the ideal composition may be determined from these results taken together. Thereby, even a user not good at taking photographs can image a photograph of good composition (obtain an image of good composition). In addition, the imaging range 23 can be determined even when the three-dimensional coordinates of the eye and the hands of the user cannot be calculated accurately.

In the present specification, a system refers to an apparatus as a whole formed by a plurality of devices.

It is to be noted that embodiments of the present disclosure are not limited to the foregoing embodiments, and that various changes can be made without departing from the spirit of the present disclosure.

The present disclosure contains subject matter related to that disclosed in Japanese Priority Patent Application JP 2010-274231 filed in the Japan Patent Office on Dec. 9, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. An imaging method comprising:
   detecting, by an imaging device, a user that is present within a predetermined area;
   calculating three-dimensional coordinates of an eye and at least one hand of the detected user;
   determining an imaging range on a basis of the calculated three-dimensional coordinates of the eye, the at least one hand of the user, and a distance between the user and a subject person; and
   imaging the determined imaging range.

2. The imaging method according to claim 1,
   wherein the imaging range is determined by projecting three-dimensional coordinates of a rectangle identified by fingers of both hands of the user from the three-dimensional coordinates of the eye of the user.

3. The imaging method according to claim 1,
   wherein an imaging direction is determined on a basis of the calculated three-dimensional coordinates of the eye and the at least one hand of the user, and an optimum composition set in advance for the determined imaging direction is set as the imaging range.

4. The imaging method according to claim 2, further comprising:
   searching images stored in advance for a similar image that is similar to a picked-up image obtained as a result of the imaging; and
   correcting the picked-up image using the similar image.

5. The imaging method according to claim 4, further comprising:
   identifying a group member belonging to a same group as the user from among subject persons in the picked-up image obtained as the result of the imaging;
   wherein a region of a subject person other than the group member in the picked-up image is replaced using the similar image.

6. The imaging method according to claim 3, further comprising:
   searching images stored in advance for a similar image that is similar to a picked-up image obtained as a result of the imaging; and
   correcting the picked-up image using the similar image.

7. The imaging method according to claim 6, further comprising:
   identifying a group member belonging to a same group as the user from among subject persons in the picked-up image obtained as the result of the imaging;
   wherein a region of a subject person other than the group member in the picked-up image is replaced using the similar image.

8. An imaging device comprising:
   a detecting section detecting a user that is present within a predetermined area;
   a calculating section calculating three-dimensional coordinates of an eye and at least one hand of the detected the user;
   a determining section determining an imaging range on a basis of the calculated three-dimensional coordinates of the eye, the at least one hand of the user, and a distance between the user and a subject person; and
   an imaging section imaging the determined imaging range.

9. An imaging device comprising:
   a detector that detects a user that is present within a predetermined area;
   a calculator that calculates three-dimensional coordinates of an eye and at least one hand of the detected the user;
   a determiner that determines an imaging range on a basis of the calculated three-dimensional coordinates of the eye, the at least one hand of the user, and a distance between the user and a subject person; and
   an imager that images the determined imaging range.

* * * * *